US012087183B2

(12) United States Patent
Hall et al.

(10) Patent No.: US 12,087,183 B2
(45) Date of Patent: Sep. 10, 2024

(54) ENVIRONMENTALLY REACTIVE LABELS

(71) Applicant: Hall Labs LLC, Provo, UT (US)

(72) Inventors: David R. Hall, Provo, UT (US); Jared Eggett, Lehi, UT (US); David Brent Noel, Orem, UT (US)

(73) Assignee: Hall Labs LLC, Provo, UT (US)

( * ) Notice: Subject to any disclaimer, the term of this patent is extended or adjusted under 35 U.S.C. 154(b) by 560 days.

(21) Appl. No.: 17/146,482

(22) Filed: Jan. 11, 2021

(65) Prior Publication Data

US 2022/0223071 A1 Jul. 14, 2022

(51) Int. Cl.
*G09F 3/02* (2006.01)
*G09F 3/00* (2006.01)

(52) U.S. Cl.
CPC .......... *G09F 3/0291* (2013.01); *G09F 3/0297* (2013.01); *G09F 2003/0208* (2013.01)

(58) Field of Classification Search
CPC ............ G06K 19/06037; G09F 3/0291; G09F 3/0297; G09F 2003/0208
USPC .................................................. 235/491, 494
See application file for complete search history.

(56) References Cited

U.S. PATENT DOCUMENTS

| | | | | |
|---|---|---|---|---|
| 11,734,640 B2 * | 8/2023 | Simons | G06Q 10/0832 | 705/332 |
| 2008/0232427 A1 * | 9/2008 | Leute | G01K 3/005 | 374/161 |
| 2008/0290174 A1 * | 11/2008 | Norrby | B41M 5/41 | 235/487 |
| 2012/0326878 A1 * | 12/2012 | Viguie | G01K 3/04 | 340/584 |
| 2015/0161918 A1 * | 6/2015 | Byrne | H01J 37/32752 | 428/29 |
| 2021/0034831 A1 * | 2/2021 | Abdo | G01K 3/04 | |

* cited by examiner

*Primary Examiner* — Cassandra Davis

(57) ABSTRACT

A label and methods and devices for detecting an environmental factor that exceeds a threshold are described. The label includes a plurality of codable areas. The first portion of the plurality of codable areas are coded according to a first value and the second portion of the plurality of codable areas are coded according to a second value. The label additionally includes an environmentally triggered bubble positioned in one of the plurality of codable areas. The environmentally triggered bubble changes between the first value and the second value when ruptured. As a result, the code that the label represents changes when the environmentally triggered bubble ruptures.

9 Claims, 6 Drawing Sheets

ENVIRONMENTALLY REACTIVE LABELS

CROSS-REFERENCE TO RELATED APPLICATIONS

The present application for patent claims priority to U.S. Provisional Application No. 62/959,341, filed Jan. 10, 2020, which is assigned to the assignee of the present application and hereby expressly incorporated by reference

TECHNICAL FIELD

The described systems, devices, and methods are directed to the labels used to track items.

BACKGROUND

Certain products may be impacted by environmental factors (e.g., exposure to air, water, shock, electricity, magnetism, light, radiation, time, temperature, etc.). Traditionally, quality assurance is performed at the time of manufacture and packaged in a way that protects or otherwise mitigates the risk of damage or degradation of the products as they move through the delivery chain to the end user. Unfortunately, manufacturers are limited in their ability to control environmental factors and despite best efforts some products are degraded, damaged, or destroyed prior to reaching the end user. Shrinkage generally refers to the loss of goods between manufacture and sale. In today's global economy, shrinkage has huge economic impacts and represents billions of dollars of loss annually. Accordingly, solutions are needed to reduce shrinkage and to better ensure the quality of products being provided to end users.

SUMMARY

In a first aspect, the disclosure describes a label. The label includes a plurality of codable areas, wherein a first portion of the plurality of codable areas are coded according to a first value, and wherein a second portion of the plurality of codable areas are coded according to a second value; and an environmentally triggered bubble positioned in one of the plurality of codable areas, wherein the environmentally triggered bubble changes between the first value and the second value when ruptured.

In a second aspect, the disclosure provides that the environmentally triggered bubble ruptures in response to an environmental factor exceeding a threshold.

In a third aspect, the disclosure provides that the environmental factor is one of exposure to air, exposure to water, exposure to shock, exposure to electricity, exposure to magnetism, exposure to light, radiation, exposure to electromagnetic radiation, exposure to time delay, and exposure to temperature.

In a fourth aspect, the disclosure provides that the environmentally triggered bubble comprises a shell that is substantially filled with a fluid.

In a fifth aspect, the disclosure provides that the shell presents as the first value and wherein the fluid presents as the second value.

In a sixth aspect, the disclosure provides that the label represents a first code before the environmentally triggered bubble ruptures and wherein the label represents a second code that is different than the first code when the environmentally triggered bubble ruptures.

In a seventh aspect, the disclosure provides that the second code differs from the first code by one digit.

In an eighth aspect, the disclosure provides that each of the plurality of codable areas is one of the first value and the second value.

In a ninth aspect, the disclosure provides that the label is one of a barcode and a quick response code.

In a tenth aspect, a method for detecting an environmental factor is described. The method includes capturing a first image of a label, wherein the label represents a first code; capturing a second image of the label, wherein the label represents a second code that is different than the first code; identifying an environmental factor that exceeded a threshold based on the difference between second code and the first code.

In an eleventh aspect, the disclosure provides that the label includes an environmentally triggered bubble positioned in one of a plurality of codable areas in the label.

In a twelfth aspect, the disclosure provides that the environmentally triggered bubble comprises a shell that is substantially filled with a fluid.

In a thirteenth aspect, the disclosure provides that the shell presents as the first value and wherein the fluid presents as the second value.

In a fourteenth aspect, the disclosure provides that the environmentally triggered bubble ruptures in response to an environmental factor exceeding a threshold, and wherein the environmentally triggered bubble changes between a first value and a second value when ruptured.

In a fifteenth aspect, the disclosure provides that the label represents the first code before the environmentally triggered bubble ruptures and wherein the label represents the second code when the environmentally triggered bubble ruptures.

In a sixteenth aspect, the disclosure provides that the environmental factor is one of exposure to air, exposure to water, exposure to shock, exposure to electricity, exposure to magnetism, exposure to light, radiation, exposure to electromagnetic radiation, exposure to time delay, and exposure to temperature.

In a seventeenth aspect, a device for detecting an environmental factor is described. The device includes a processor; memory in electronic communication with the processor; and instructions stored in memory that when executed by the processor cause the processor to: obtain a first image of a label, wherein the label represents a first code; obtain a second image of the label, wherein the label represents a second code that is different than the first code; identify an environmental factor that exceeded a threshold based on the difference between second code and the first code.

In an eighteenth aspect, the disclosure provides that the instructions are further executable by the processor to trigger an alert based on the identified environmental factor.

In a nineteenth aspect, the disclosure provides that the label includes an environmentally triggered bubble positioned in one of a plurality of codable areas in the label.

In a twentieth aspect, the disclosure provides that the environmentally triggered bubble ruptures in response to an environmental factor exceeding a threshold, and wherein the environmentally triggered bubble changes between a first value and a second value when ruptured.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed systems, devices, and methods and are not intended to show every potential feature or embodiment of the claimed systems, devices, and methods. The drawings are not necessarily drawn to scale; in some instances, certain elements of the drawing may be enlarged with respect to other elements of the drawing for purposes of illustration.

DETAILED DESCRIPTION

Figure 1:
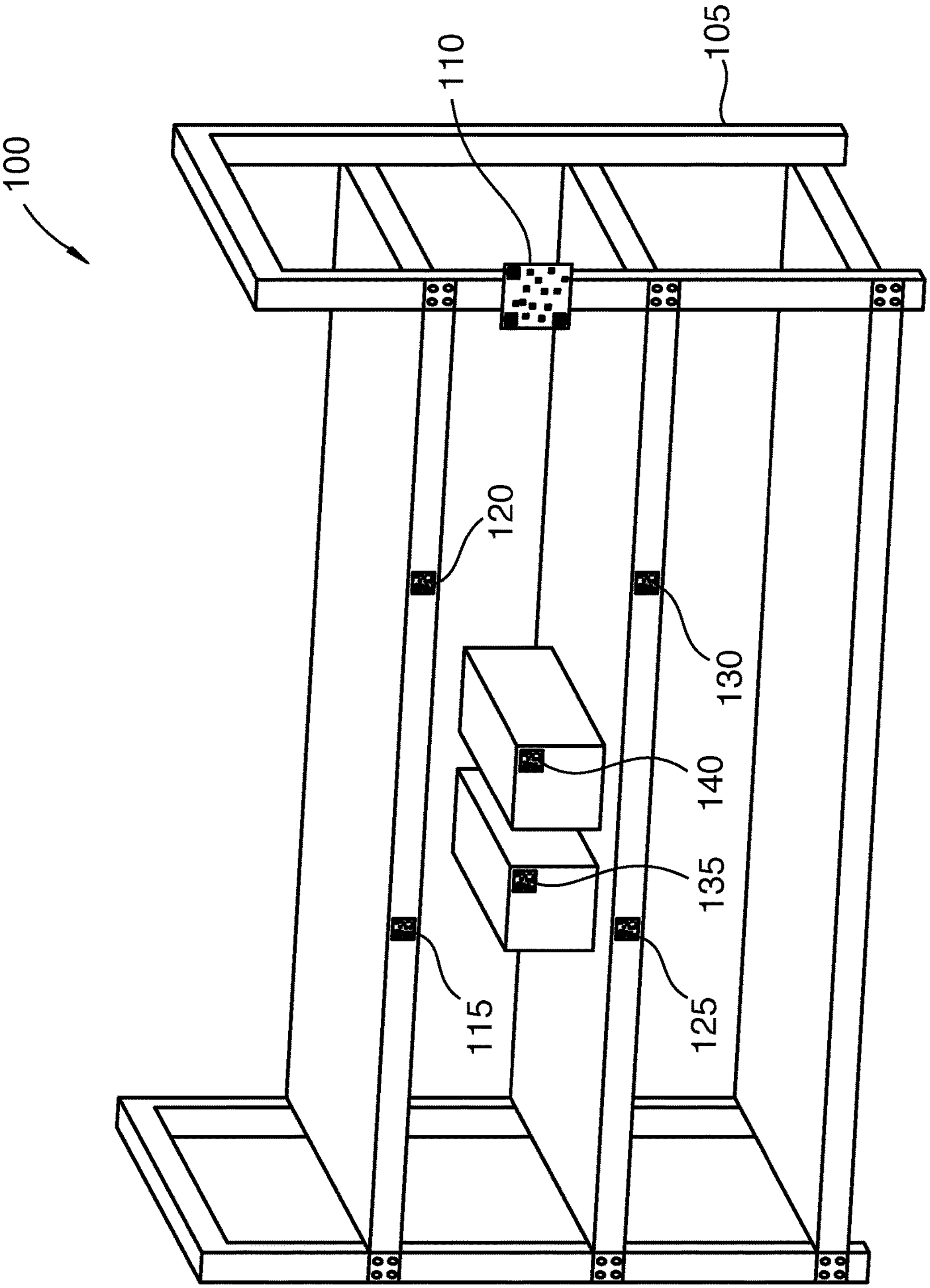
FIG. 1 is a perspective diagram illustrating an embodiment in which the described systems and methods may be used.

The following description recites various aspects and embodiments of the systems, devices, and methods disclosed herein. No particular embodiment is intended to define the scope of the described systems, devices, and methods. Rather, the embodiments provide non-limiting examples of various compositions, and methods that are included within the scope of the claimed systems, devices, and methods. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As noted above, certain products may be impacted by environmental factors (e.g., exposure to air, water, shock, electricity, magnetism, light, radiation, time, temperature, etc.). Often degradation, damage, and/or destruction (e.g., spoilage) is hidden beneath external packaging until discovered by the end user. This reflects badly on the manufacturer and/or the delivery chain and typically results in a poor experience for the end user. Accordingly, there is a need to be able to identify spoilage and address it before it gets to or is discovered by the end user.

Labels (e.g., barcodes, Quick Response (QR) codes, and the like) are used throughout the economy and are ubiquitous in terms of identifying products in supply and delivery chains. Labels are traditionally static. They are often printed on thermal transfer paper and are unchanging. The present systems and methods relate to a label that changes. In other words, the code (e.g., number, alphanumeric number, etc.) that is represented by the label changes with the change in the label. In other words the change in the label changes the value that the label coveys. In some embodiments, the change in the label may be strategically chosen so as to only change a certain digit of the code (the code before the change and the code after the change in the label differ by a single digit, for example). In some embodiments, a labels may include one or more features that provide additional information to a user and/or to a server that is analyzing/reading a label.

In particular, the present systems and methods use an environmentally reactive label that changes in response to the existence of one or more environmental factors (e.g., exposure to air, water, shock, electricity, magnetism, light, radiation, time, temperature, etc.). Since the label is scanned multiple times throughout the delivery chain (e.g., upon entry to a facility, upon movement within the facility, upon exit of the facility, upon transportation events, etc.), the present systems and methods allow for easy identification of where in the delivery chain the label changed. Because the label changes, spoilage or environmental factors that lead to spoilage maybe identified, mitigated, or addressed on the very next scan of the label after such environmental factors occurred. This represents an opportunity for substantial cost savings, process improvements, as well as improved end user experiences. In some embodiments, this may allow certain risks to be identified, addressed, mitigated, or even cured shortly after the time of discovery (i.e., at the next label scanning point in the delivery chain).

Turning now to the figures, FIG. 1 is a perspective diagram illustrating an embodiment 100 in which the described systems and methods may be used. In this embodiment, labels may be used to identify locations (as is the case of labels 110, 115, 120, 125, and 130, for example) as well as be used to identify boxes (as is the case of labels 135 and 140, for example). Labels 135 and 140 may be reactive labels (e.g., environmentally reactive labels) that change in response to one or more environmental factors. When not changed, or when changed, the reactive labels 135 and 140 are substantially similar in appearance except for the change to the code that the label represents.

For example, a label (e.g., a QR code) may contain a portion that changes based on environmental factors (e.g., experiencing a G-force, being exposed to radiation (e.g., sunlight, x-rays), exposure to temperature changes (e.g., above/below a threshold). For example, one or more dots of a QR code may rupture or change appearance (e.g., visual appearance such as color, or computer detectable attribute, such as size of dot, reflectivity of dot, and the like. As discussed before, any error or irregularity, including a label that conveys environmental exposure, may trigger alerts, and or flags attention to additional investigation of the item.

Figure 2:
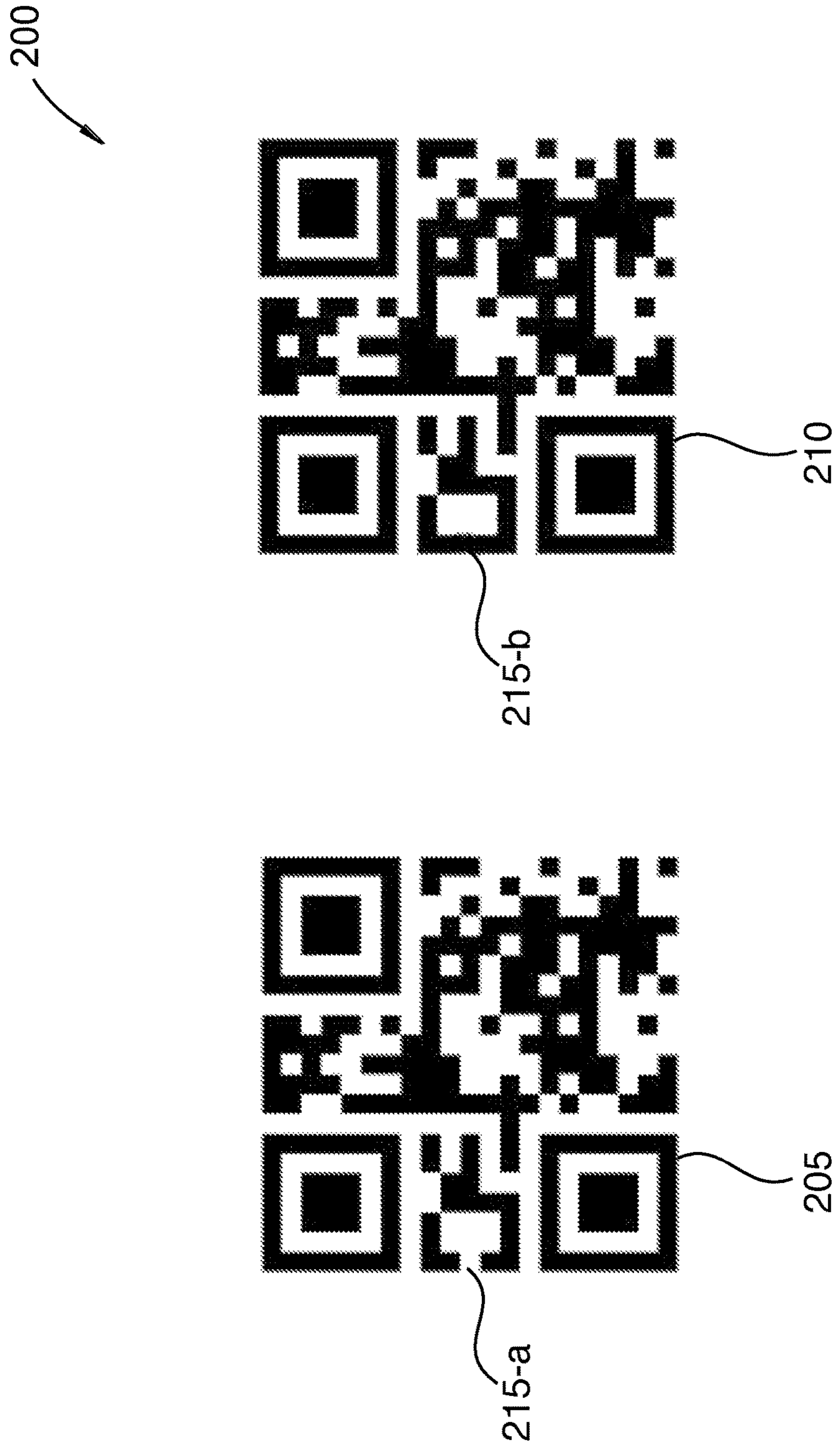
FIG. 2 is an illustrative view of how a label changes as a result of a triggering environmental factor.

FIG. 2 is an illustrative view of how a label changes as a result of a triggering environmental factor. Label 205 is a label as it exists before a triggering environmental factor. The label 205 represents a first code (e.g., #123456) based on the particular coding scheme used for the QR code. Label 210 is the label as it exists after a triggering environmental factor. The label 210 represents a second code (e.g., #123459) based on the particular coding scheme used for the QR code.

Figure 5:
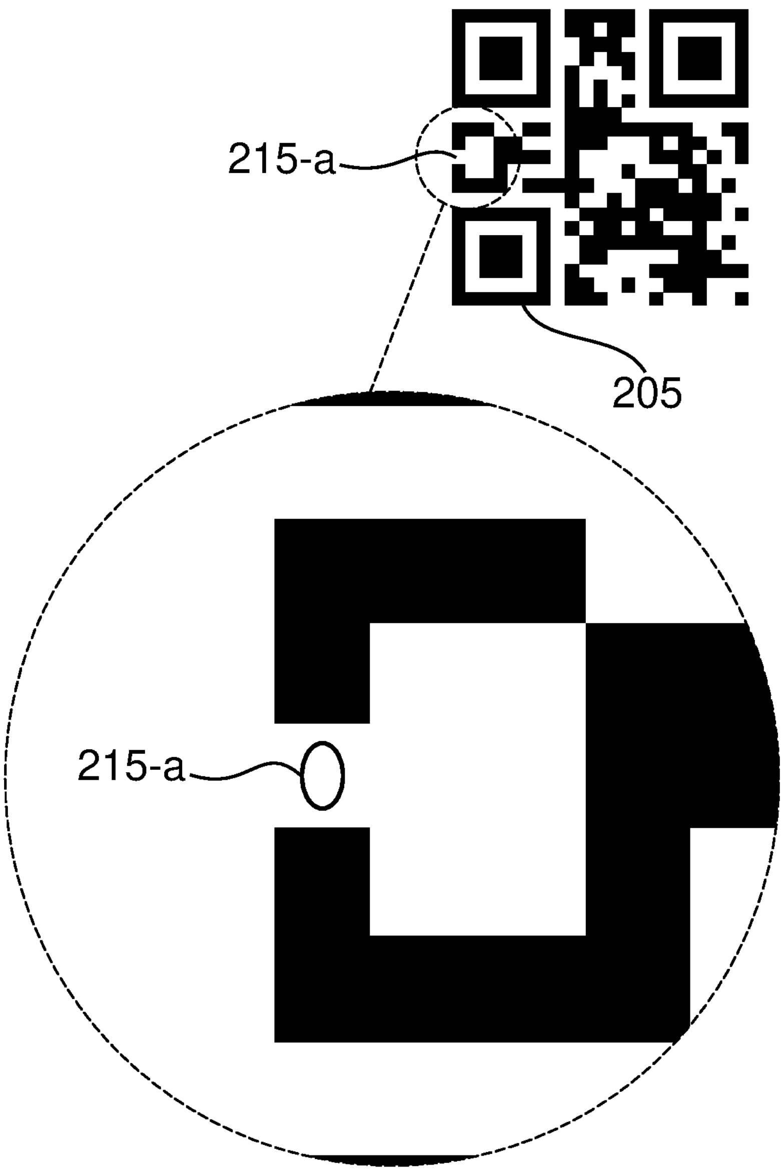
FIG. 5 is an illustrative view of an unruptured bubble in the label illustrated in FIG. 2.
Figure 6:
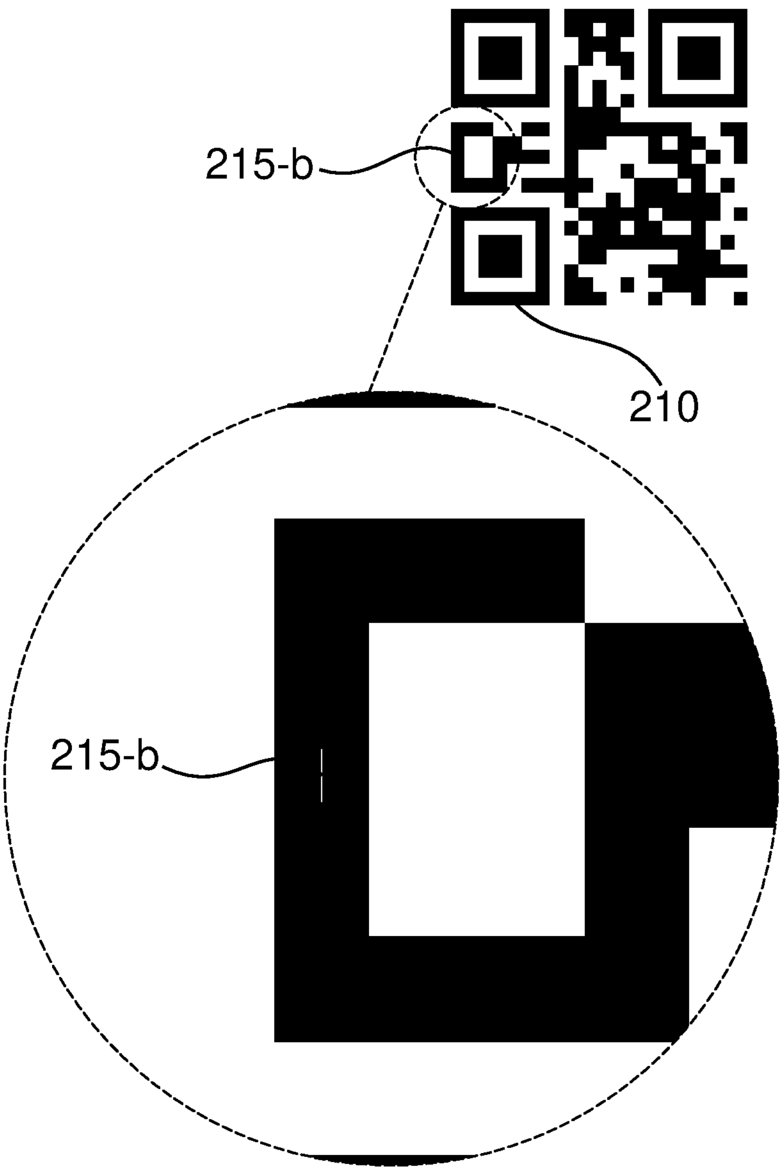
FIG. 6 is an illustrative view of a ruptured bubble in the label illustrated in FIG. 2.

As illustrated, the QR code represents the code by the absence of (e.g., white) or existence of (e.g., black) a dot in the coded area. FIG. 5 is an illustrative view of an unruptured environmentally triggered bubble 215-*a* in label 205 as illustrated in FIG. 2. When unruptured, the environmentally triggered bubble 215-*a* may have a white bubble shell so that a dot in the coded area has a first value (e.g., white) in the coded area. The environmentally triggered bubble 215-*a* may contain black ink that would be released if the environmentally triggered bubble 215-*a* were ruptured (e.g., in response to one or more environmental factors). The environmentally triggered bubble 215 (e.g., 215-*a*, 215-*b*) may be made of a material that disintegrates at a given rate in response to a particular environmental factor. When the disintegration of the shell of the environmentally triggered bubble 215 reaches a specific threshold level, the environmentally triggered bubble 215 may rupture (e.g., environmentally triggered bubble 215-*b*), which would result in the contents of the environmentally triggered bubble 215-*b* to be released. FIG. 6 is an illustrative view of a ruptured environmentally triggered bubble 215-bin label 210 as illustrated in FIG. 2. When ruptured, the environmentally triggered bubble 215-*a* may release its contents (e.g., black ink) so that a dot in the coded area has a second value (e.g., black) in the coded area. This contrasting relationship enables an environmentally triggered bubble 215 that ruptures when triggered to be white (e.g., environmentally triggered bubble 215-*a*) when not ruptured (as a result of a white bubble shell, for example) and to be black (e.g., environmentally triggered bubble 215-*b*) when ruptured (as a result of black ink being released from the ruptured bubble shell, for example).

The environmentally triggered bubble 215 may be made of a material that disintegrates at a given rate in response to a particular environmental factor. It is appreciated that different materials have different properties such that a material may be selected to target a specific environmental factor with a specific threshold level. In the case that the environmentally triggered bubble 215 is made of a single material, the environmentally triggered bubble 215 may allow the code to change based on a single environmental factor. It is appreciated that environmentally triggered bubbles may be made of two or more materials to enable the environmentally triggered bubble to be triggered based on any of the two or more environmental factors associated with the selected two or more materials. In general, it is anticipated that environmentally triggered bubbles 215 are designed to target a specific environmental factor to increase the granularity of which environmental factor triggered the environmentally triggered bubble 215.

Figure 3:
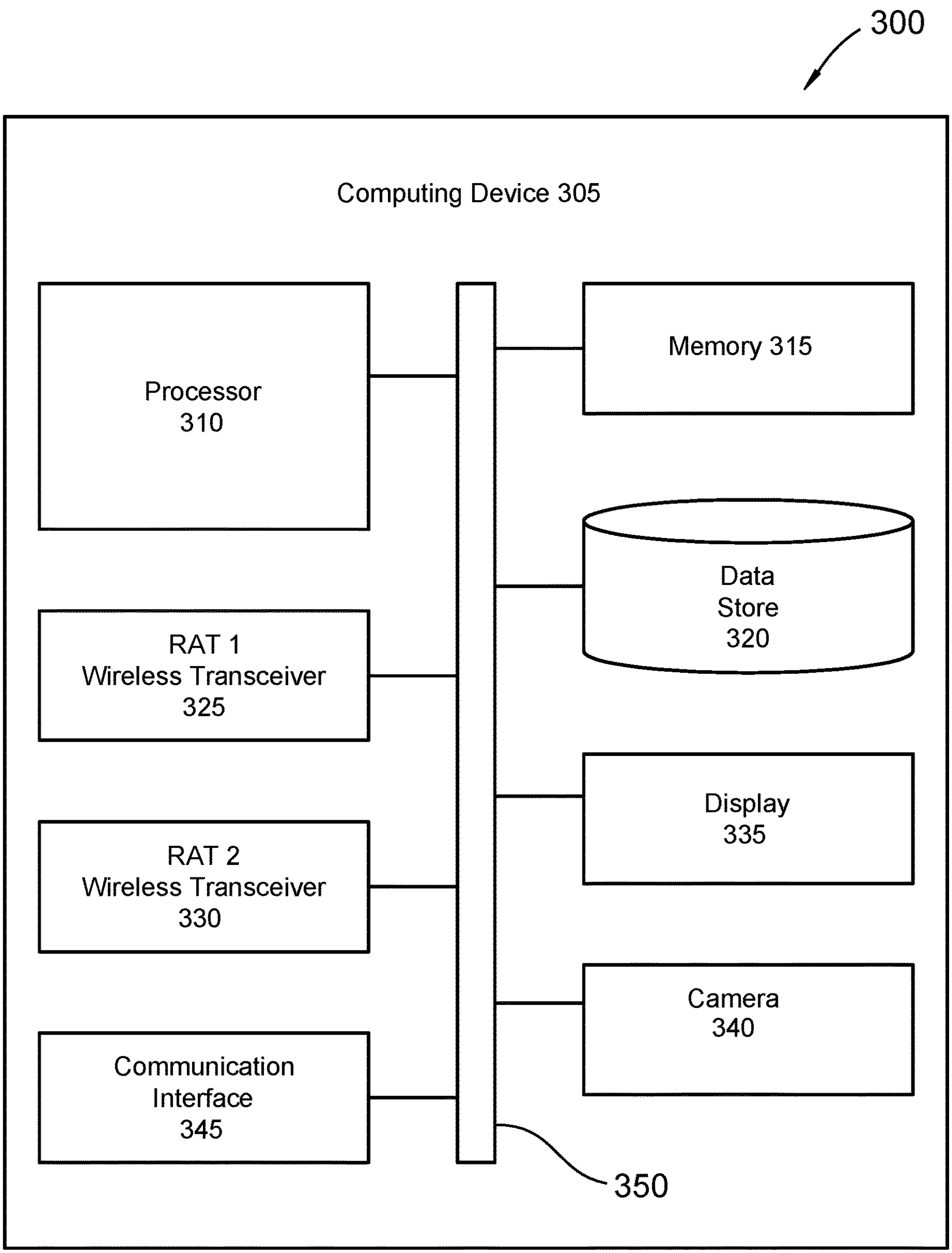
FIG. 3 is a block diagram of a computing device for implementing the described systems and methods.

FIG. 3 is a block diagram of a computing device 300 for implementing the described systems and methods. In some embodiments, the label described herein may be read by the computing device. In some embodiments, the computing device may implement the various algorithms described herein.

The computing device 305 includes a processor 310 (including a general-purpose processor and one or more application specific processors, for example), a wireless transceiver 325 for communicating via a first RAT (e.g., Wi-Fi, Bluetooth, 3G, 4G, LTE, 5G-NR, and/or Lora WAN), an optional wireless transceiver 330 for communicating via a second RAT (e.g., Bluetooth, Wi-Fi), a communication interface 345 (e.g., serial interface, peripheral component interconnect express), a memory 315 (e.g., random access memory (RAM), non-volatile RAM (NVRAM)), data store 320 (e.g., hard disk drive, solid state disk), an optional display 335 for interfacing with a user, a camera 340 for capturing an image of a label, for example, and an interconnect or bus 350 for interconnecting each of the components 310-340.

In some embodiments, the memory 315 and/or the data store 320 (each being a non-transitory storage medium, for example) may store instructions that are executable by the processor 310 to implement the systems and methods described herein. For example, the instructions may be executable by the processor e10 to implement any of the methods (or algorithms) described herein.

Figure 4:
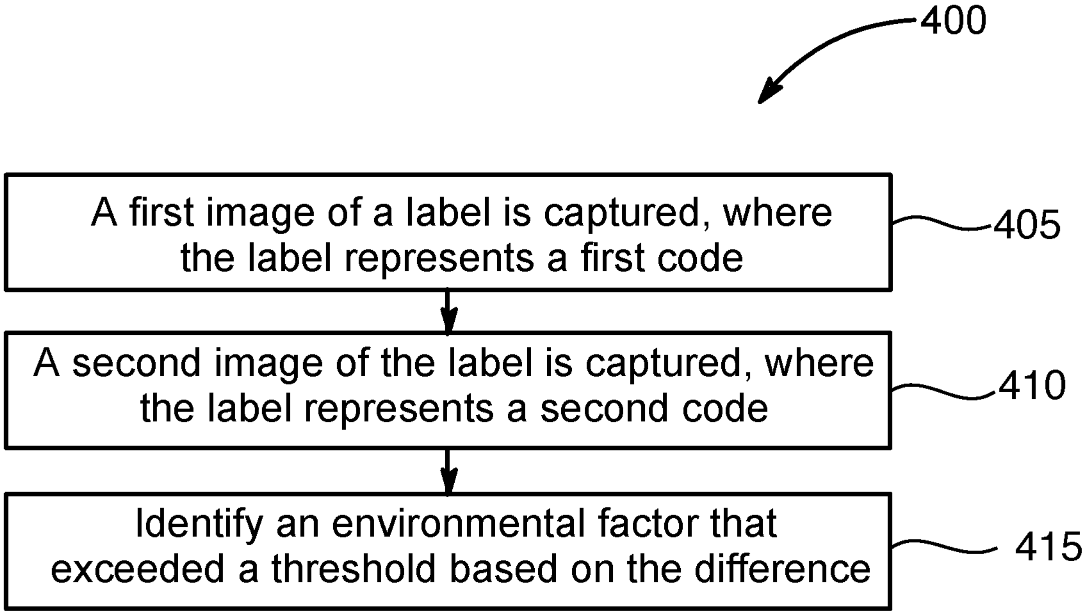
FIG. 4 is a flow diagram illustrating one example of a method for detecting an environmental factor.

FIG. 4 is a flow diagram illustrating one example of a method 400 for detecting an environmental factor. The method 400 may be implemented by a computing device 305 or an application specific processor (e.g., processor and memory) included within a device.

At 405, a first image of a label is captured, where the label represents a first code. At 410, a second image of the label is captured, where the label represents a second code that is different than the first code. At 415, an environmental factor is identified as exceeding a threshold based on the difference between the first code and the second code.

The systems, devices, and methods described herein have been described with reference to various specific and preferred embodiments and techniques. Nevertheless, it is understood that many variations and modifications may be made while remaining within the spirit and scope of the describes systems, devices, and methods.

What is claimed is:

1. A label, comprising:

a plurality of codable areas, wherein a first portion of the plurality of codable areas are coded according to a first value, and wherein a second portion of the plurality of codable areas are coded according to a second value; and an environmentally triggered bubble positioned in one of the plurality of codable areas, wherein the environmentally triggered bubble changes between the first value and the second value when ruptured.

2. The label of claim 1, wherein the environmentally triggered bubble ruptures in response to an environmental factor exceeding a threshold.

3. The label of 1, wherein the environmental factor is one of exposure to air, exposure to water, exposure to shock, exposure to electricity, exposure to magnetism, exposure to light, radiation, exposure to electromagnetic radiation, exposure to time delay, and exposure to temperature.

4. The label of claim 1, wherein the environmentally triggered bubble comprises a shell that is substantially filled with a fluid.

5. The label of claim 4, wherein the shell presents as the first value and wherein the fluid presents as the second value.

6. The label of claim 4, wherein the label represents a first code before the environmentally triggered bubble ruptures and wherein the label represents a second code that is different than the first code when the environmentally triggered bubble ruptures.

7. The label of claim 6, wherein the second code differs from the first code by one digit.

8. The label of claim 1, wherein each of the plurality of codable areas is one of the first value and the second value.

9. The label of claim 1, wherein the label is one of a barcode and a quick response code.

* * * * *